(12) United States Patent
Engler et al.

(10) Patent No.: US 6,480,322 B2
(45) Date of Patent: Nov. 12, 2002

(54) METHOD OF IMPROVING THE RESPONDABILITY OF MOVEABLE STRUCTURES IN A DISPLAY

(75) Inventors: David A. Engler; Rolf W. Biernath, both of St. Paul, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 09/805,844

(22) Filed: Mar. 14, 2001

(65) Prior Publication Data

US 2002/0131149 A1 Sep. 19, 2002

(51) Int. Cl.⁷ ............................ G02B 26/00; B01J 13/02
(52) U.S. Cl. ................... 359/296; 427/213.34; 345/107
(58) Field of Search ........................... 359/296; 345/85, 345/107; 349/86; 427/213.3, 213.31, 213.34, 213.36; 428/323, 327, 402.21, 407; 264/4.7, 343; 523/207, 210

(56) References Cited

U.S. PATENT DOCUMENTS

| | | | |
|---|---|---|---|
| 3,612,758 A | 10/1971 | Evans et al. | 359/296 |
| 4,126,854 A | 11/1978 | Sheridon | 345/104 |
| 4,261,653 A | 4/1981 | Goodrich | 359/296 |
| 4,290,174 A | 9/1981 | Kalleberg | 24/204 |
| 4,438,160 A | 3/1984 | Ishikawa et al. | 427/214 |
| 5,077,870 A | 1/1992 | Melbye et al. | 24/452 |
| 5,201,101 A | 4/1993 | Rouser et al. | 24/575 |
| 5,262,098 A | 11/1993 | Crowley et al. | 264/8 |
| 5,344,594 A | 9/1994 | Sheridon | 264/4.1 |
| 5,389,945 A | 2/1995 | Sheridon | 345/85 |
| 5,737,115 A | 4/1998 | Mackinlay et al. | 359/296 |
| 5,751,268 A | 5/1998 | Sheridon | 345/107 |
| 5,754,332 A * | 5/1998 | Crowley | 345/107 |
| 5,760,761 A | 6/1998 | Sheridon | 345/107 |
| 5,777,782 A | 7/1998 | Sheridon | 359/296 |
| 5,815,306 A | 9/1998 | Sheridon et al. | 359/296 |
| 5,825,529 A | 10/1998 | Crowley | 359/296 |
| 6,055,091 A | 4/2000 | Sheridon et al. | 359/296 |
| 6,128,124 A | 10/2000 | Silverman | 359/296 |

FOREIGN PATENT DOCUMENTS

| | | |
|---|---|---|
| EP | 0 902 410 A2 | 9/1998 |
| EP | 0 935 230 A2 | 5/1999 |

* cited by examiner

*Primary Examiner*—Evelyn A Lester
(74) *Attorney, Agent, or Firm*—Stephen W. Buckingham; Kinney & Lange

(57) ABSTRACT

A method improves the respondability of moveable structures in a display medium, such as a gyricon display. The inventive method includes heating the display and exercising the rotatable structures within the display by an application of an electrical field. Applying heat to the display enlarges the cavity surrounding each particle due to thermal expansion of the cavity and the bead rotation cycling jostles the particles loose. The inventive method enables a larger percentage of the particles to rotate to a greater degree thereby improving resolution of an image. Alternatively, heating and exercising can be accomplished by application of ultrasonics. In addition, degassing the fluid contained in the display enhances switching with heat and improves the rotatability of the structures.

21 Claims, 9 Drawing Sheets

METHOD OF IMPROVING THE RESPONDABILITY OF MOVEABLE STRUCTURES IN A DISPLAY

BACKGROUND OF THE INVENTION

The present invention relates to visual displays, and more particularly to addressable, reusable, paper-like visual displays, such as "gyricon" or twisting-ball displays. Specifically, the invention relates to a method for improving the rotatability of optically anisotropic particles within such displays.

A gyricon display, also called a twisting-ball display, rotary ball display, particle display, dipolar particle light valve, etc., offers a technology for making a form of electric paper and other electronically controlled displays. Briefly, a gyricon display is an addressable display made up of a multiplicity of optically anisotropic particles, with each particle being selectively rotatable to present a desired face to an observer. For example, a gyricon display can incorporate beads or "balls" where each ball has two generally distinct hemispheres, one black and the other white, with each hemisphere having a distinct electrical characteristic (e.g., zeta potential with respect to a dielectric fluid) so that the ball is electrically as well as optically anisotropic. The balls are electrically dipolar and are subject to rotation. A ball can be selectively rotated, for example, by application of an electric field, so as to present either its black or white hemisphere to an observer viewing the surface of the sheet.

A reflective image is formed by the pattern collectively created by individual black and white hemispheres. By the application of an electric field addressable in two dimensions (as by a matrix addressing scheme), the black and white sides of the balls are controlled as the image elements (e.g., pixels or subpixels) of a displayed image. Alternatively, the display may be controlled by shaped electrodes to form one or more fixed images.

The balls are typically embedded in a sheet of optically transparent material, such as an elastomer sheet. A dielectric fluid, such as a dielectric plasticizer, is used to swell the elastomer sheet containing the balls. Through this swelling, the dielectric fluid saturates the elastomer and effectively creates a fluid-filled cavity around each ball. The fluid-filled cavity accommodates the ball and allows the ball to rotate within its respective fluid-filled cavity, yet prevents the ball from migrating within the sheet.

When an electric field is applied to the sheet over a bead, the electrical force on the bead overcomes the frictional adhesion of the bead to the cavity wall and causes the bead to rotate. Once rotation is complete, each bead is restricted to a fixed rotational position within its cavity. Thus, even after the electric field is removed, the structures (balls) will stay fixed in position until they are dislodged by another electric field. This bistability of the beads enables the gyricon display to maintain a fixed image without power. The bistability of a gyricon display is beneficial over other types of displays such as a liquid crystal display (LCD) or a light emitting diode (LED) display which consume energy to maintain an image. Gyricon displays are thus particularly useful for displays which will show an image for a prolonged period of time and only periodically have the image changed.

Gyricon displays are not limited to black and white images, as gyricon and other display mediums are known in the art to have incorporated color. Gyricon displays have been developed incorporating either bichromal color, trichromol color, or four quadrant colored balls. Also developed are three or four segmented colored balls, as disclosed in U.S. Pat. No. 6,128,124 (Silverman, ADDITIVE COLOR ELECTRIC PAPER WITHOUT REGISTRATION OR ALIGNMENT OF INDIVIDUAL ELEMENTS), incorporated by reference herein.

The colored balls can be charged by adsorption of ions from a liquid onto the ball surface. Alternatively, colored balls can be charged by electret formation by injection of an external charge into the surface region of a colored ball, as is disclosed in U.S. Pat. No. 6,072,621 (Kishi, COLOR BALL DISPLAY SYSTEM), incorporated by reference herein.

Like ordinary paper, gyricon displays preferably can be written on and erased, can be read in ambient light, and can retain imposed information in the absence of an electric field or other external retaining energy source. Also like ordinary paper, electric paper types of gyricon displays preferably can be made in the form of a lightweight, flexible, durable sheet that can be folded or rolled into tubular form about any axis and can be conveniently placed into a shirt or coat pocket and then later retrieved, restraightened, and read substantially without loss of information. Yet unlike ordinary paper, gyricon displays can be used to display full-motion and changing images as well as text. While gyricon displays are particularly useful for displays where real-time imagery is not essential, gyricon displays are adaptable for use in a computer system display screen or a television.

Gyricon display arrangements have typically taken one of three forms: (1) a slurry coat with balls randomly dispersed in a relatively thick film, (2) a monolayer where balls are closely packed in a layer; or (3) a dual layer, where balls are closely packed in a first layer and a second layer of balls is provided to fill in the voids. To create displays which appear brighter with sharper images, gyricon displays should have high light reflectance. One way to improve the reflectance of a monolayer gyricon display is to closely pack the bichromal balls. However, in dual or multiple layer displays, the packing density of the balls may be of little consequence insofar as overall display reflectance is concerned, because balls located farther from the viewing surface of the gyricon display will "fill in the gaps" between balls located nearer the viewing surface. So long as the two-dimensional projection of the balls onto the viewing surface at all distances from the viewing surface substantially covers the viewing surface, a high-quality display will be obtained.

In the context of gyricon displays, the "balls" are not necessarily perfectly round or hemispherical. Instead of balls, a gyricon display can use substantially cylindrical bichromal particles rotatably disposed in a substrate. The twisting cylinder display has certain advantages over the rotating ball gyricon display because the bichromal elements can achieve a higher packing density. The higher packing density leads to improvements in the brightness of the twisting cylinder display as compared to the rotating ball gyricon display.

One drawback to twisting particle displays (using balls, cylinders, etc.) is that the quality of the image viewed is dependent on the rotatability of the structures within the fluid. In practice, a particle may not rotate completely or not at all, thus only partially exposing the white or black color or a mix therebetween. Incomplete rotation or non-rotation causes a loss in image contrast and color purity. It is therefore desirable to improve the resolution of the image on the display by improving the rotatability of the structures within the fluid.

BRIEF SUMMARY OF THE INVENTION

The present invention is a method for improving the respondability of moveable particles in a display medium and the structure obtained thereby. The moveable particles can be generally spherical, generally cylindrical or the like and generally bichromal. The invention consists of heating the display, preferably while agitating (causing movement of) the particles within the display media. The particles may be exercised before or after the application of heat, however, best results are obtained when the particles are heated and exercised simultaneously.

While the above-identified drawing figures set forth preferred embodiments of the invention, other embodiments are also contemplated, as noted in the discussion. In all cases, this disclosure presents the present invention by way of representation and not limitation. It should be understood that numerous other modifications and embodiments can be devised by those skilled in the art which fall within the scope and spirit of the principles of this invention. It should be specifically noted that FIGS. 1–6 have not been drawn to scale, as it has been necessary to enlarge certain portions for clarity. It should also be noted that FIGS. 1,2, 4 and 5 show idealized representations of balls with a hemispherical surface having a color different from the remainder of the ball member. In application, some balls have a rough surface, are irregularly shaped, have incomplete hemispherical coloring, partial hemispherical coloring, have swirled or mixed colors and sometimes speckles or spotted hemispherical coloring on the balls. Also in application the balls are much more tightly fit into the cavities and the beads are packed much more closely together.

DETAILED DESCRIPTION

The present invention is a method for improving the rotatability of a plurality of moveable optically anisotropic particles in a visual display such as the moveable particles in a gyricon display. This objective is attained by heating the display, preferably in conjunction with shearing or torquing the moveable structures therein (see, e.g. FIG. 5). The electrically and optically anisotropic particles are agitated by applying a reversing electrical or magnetic field to the balls, causing the particles to rotate back and forth.

Figure 1:
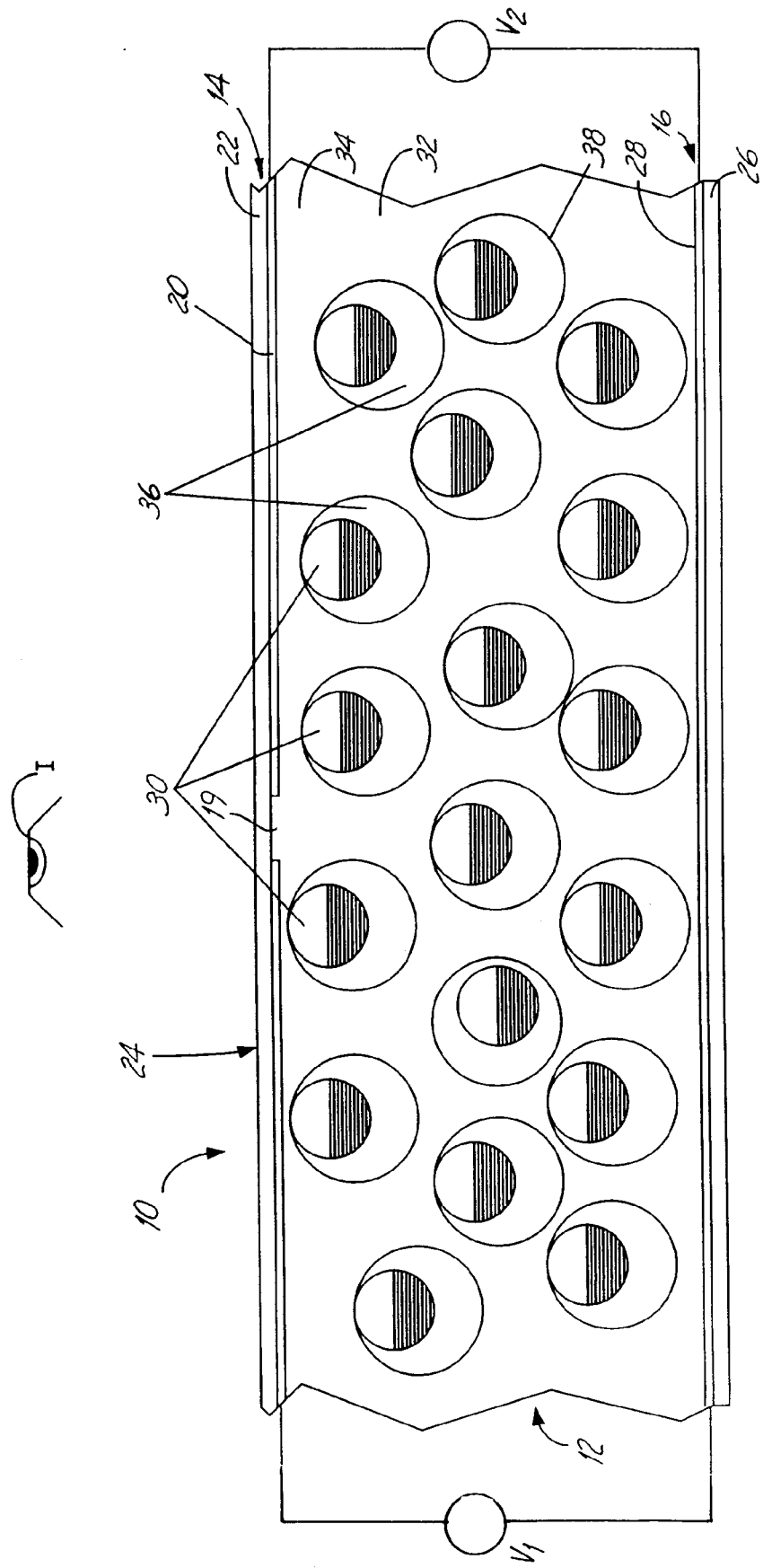
FIG. 1 is a sectional view of a display in accordance with the invention utilizing electrode plates.

The inventive method is applied to an exemplary gyricon display 10 shown in FIGS. 1, 2, 5 and 6. The gyricon display 10 in FIGS. 1, 2, 5 and 6 is a multiple fixed image display, and thus is not randomly addressable. A display 10 has a display panel 12 including gyricon particles 30 sandwiched between a top electrode sheet 14 and a bottom electrode sheet 16. As shown in FIG. 1, the top electrode sheet 14 includes a first electrode 18 and a second electrode 20 on the underside of a transparent nonconductive sheet 22. The first electrode 18 and second electrode 20 are shaped in plan view (shown in FIG. 6) to define the controlled image, shown in this embodiment as a fixed image display of the script letters "er". The first electrode 18 and a second electrode 20 are separated by a distance or insulative region 19.

Depending upon the intended use of the display 10, the top electrode sheet 14 and the bottom electrode sheet 16 can either be rigid or flexible. In the preferred embodiment, top electrode sheet 14 and bottom electrode sheet are fairly strong so as to provide the primary structural support for the display 10. For example, sheet 22 may be formed of a flexible, transparent thermoplastic film. Sheet 22 may alternatively be formed as a thin plate of glass, such as at about a 5 mil thickness.

The images are viewed through the top electrode sheet 14 and are visible on surface 24 and viewable at I. Preferably, the first and second electrodes 18, 20 are comprised of Indium Tin Oxide (ITO), which is both electrically conductive and transparent. Transparency on the front side is important so ambient light can reflect off particles 30 and can be viewed at I. The bottom electrode sheet 16 included a nonconductive substrate 26 with a backside electrode 28. Because the image is viewed at I, bottom electrode sheet 16 need not be transparent.

Each electrode 18, 20, 28 is driven by suitable electronics V1, V2 to create an electric and/or magnetic field across the display panel 12. The electric and/or magnetic field is controlled as desired to rotate the particles in a selective pattern defined by the shaped electrodes 18, 20. Through proper control, for example, the image may all light (balls 30 as shown in FIG. 1), all dark by reversing the field to rotate all the balls 30, a shaded "er" (see FIG. 6) against a light background by rotating only the balls 30 under the first electrode 18, or a light "er" against a shaded background by rotating only the balls 30 under the second electrode 20. In the preferred configuration, a voltage differential between top electrodes 18, 20 and bottom electrode 28 of about 50V will cause bead rotation or switching of color.

The display panel 12 includes a distribution of minute particles 30 which are optically anisotropic as shown by the hemispherical shading. The particles 30 are disposed in a transparent surrounding media 32. The surrounding media 32 preferably includes an elastomeric, optically transparent support material 34 and an absorbed dielectric fluid 36.. The surrounding media 32 prevents the particles 30 from having translational freedom. At the same time, the surrounding media 32 permits the particles 30 to have some degree of rotational freedom while maintaining stability against rotation in the absence of an applied field. As shown in FIG. 1, the arrangement of particles 30 may be in a thick film, with multiple layers of particles 30. Alternatively, the particles could be arranged in a monolayer or dual layer arrangement.

The optical an isotropy of the particles 30 maybe caused by a coating having different light reflectance than the base material of the particles. The coating may have a difference in Zeta potential, thereby causing the particles 30 to have an electrical anisotropy which matches the optical anisotropy.

The particles 30 of the panel 12 can be small spheres or beads. Alternatively, the particles can be of any shape including twisting cylinders as disclosed in U.S. Pat. No. 6,055,091 (Sheridon, "TWISTING-CYLINDER DISPLAY"), which is incorporated by reference herein. The distance between the top and bottom electrode sheets 14, 16 is selected in conjunction with the arrangement and size of particles 30. For small sized displays, the beads 30 have diameters in the 20 to 40 micron range. For such small particles in a thick film arrangement, the display panel 12 may have a dry thickness of 4 to 6 mils and a wet thickness of 5 to 8 mils, for a total thickness of display 10 of 14 to 18 mils. For larger area displays, such as greater than 30 square inches, the beads 30 should have a larger size, such as 50 to 500 microns and more preferably in the 85 to 105 micron range. For such larger particles in a thick film arrangement, the display panel 12 may have a dry thickness of 10 to 15 mils and a wet thickness of 12 to 20 mils.

Figure 2:
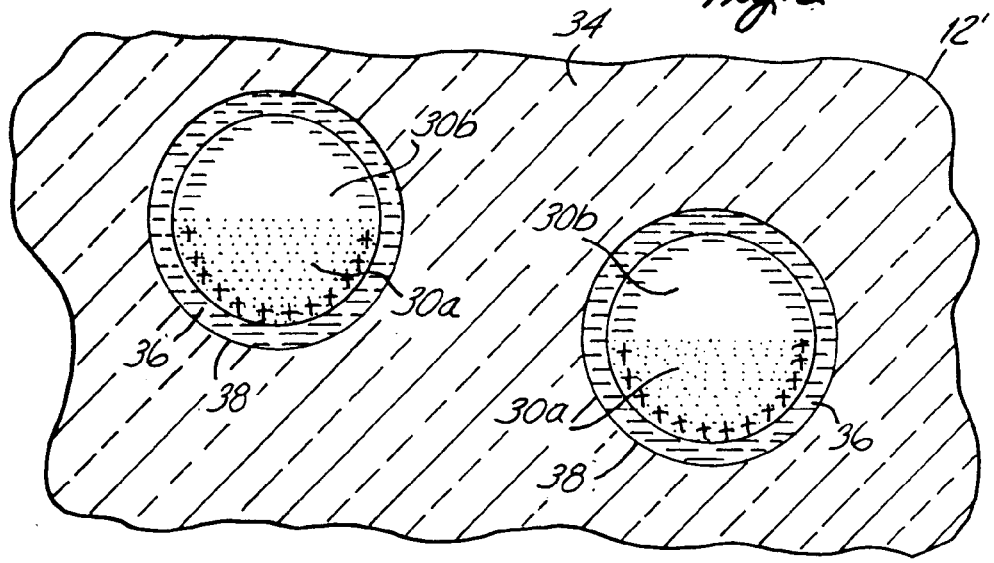
FIG. 2 illustrates an enlargement of a portion of the display of FIG. 1.

FIG. 2 is an enlarged portion 12' of the panel 12. The spheres 30 may be formed by two differently colored materials, one dark and the other light. One hemisphere 30a of each of the spheres 30 exhibits optical absorption characteristics, as illustrated by their dark shading, and the other hemisphere 30b exhibits light reflectance characteristics, as illustrated by the absence of dark shading. For example, the dark hemisphere 30a may be formed of a black polyethylene and the light hemisphere 30b formed of a titanium oxide filled polyethylene. The difference between the light reflectance-light absorption characteristics of hemispheres 30a and 30b provides the desired optical anisotropy. The beads 30 are preferably formed of a crystalline polyethylene wax, but could be formed of other materials, such as a plastic like polypropylene or glass. The beads 30 are preferably solid, but may alternatively be hollow.

For example, the bichromal balls may be formed by the spinning disc method disclosed by Crowley et al. in U.S. Pat. No. 5,262,098, the subject matter of which is fully incorporated herein by reference. Briefly, the spinning disc method includes introducing black and white pigmented, hardenable liquids to upper and lower surfaces, respectively, of a disc mounted on a rotatable spindle. The liquids are moved to the periphery of the disc by centrifugal force where they flow together, without mixing, to form bichromal ligands which then break up into bichromal beads via Raleigh break up. Ideally, the ligands break up into the form of beads which are substantially identical and have proper bichromal characteristics (i.e., one hemisphere contains the black pigment and a charge activation agent while the other hemisphere contains only the white pigment). Although the spinning disc method is capable of producing a large number of bichromal balls in a relatively short period of time, a large percentage of the balls produced may be unacceptable. In other words, the balls are not substantially identical to each other, e.g., the diameter of balls may vary over an unacceptably large range, and/or the balls may not have proper bichromal characteristics.

Alternately, the spheres 30 could be formed of a base material of one color and coated with a coating of a different color. Black coatings may be obtained by the simultaneous evaporation of magnesium fluoride and aluminum in a vacuum chamber. White coatings may be obtained by the slow deposition of indium.

The preferred beads 30 include a dark hemisphere 30a formed with a dark pigment in a base material with a charge activation agent added to the dark material. The charge activation agent from the dark material provides an electrical anisotropy which corresponds to the optical anisotropy. Thus, the spheres 30 have an electrical charge, as shown symbolically in FIG. 2 where hemispheres 30a are more positive than hemispheres 30b. The dielectric liquid 36 electrically insulates respective hemispheres to maintain the electrical anisotropy. The light and dark materials or coatings may also have differences in Zeta potential. In an optional embodiment, the beads are electromagnetically anisotropic. In other embodiments, the beads are electrostatically anisotropic, magnetically anisotropic, or a combination of both.

Another embodiment for the manufacturing of bichromal balls is disclosed in U.S. Pat. No. 4,438,160 (Ishikawa et al., METHOD OF MAKING A ROTARY BALL DISPLAY DEVICE), incorporated by reference herein. Ishikawa discloses a method for manufacturing ball members having a hemispherical surface color different from the remainder of the ball member while enabling the balls to be rotatable within a fairly small space allowing the balls to be arranged at high packing densities.

Gyricon displays are not limited to bichromal structures. Gyricons incorporating color have been described in U.S. Pat. No. 5,760,761 "HIGHLIGHT COLOR TWISTING BALL DISPLAY", U.S. Pat. No. 5,751,268 "PSEUDO-FOUR COLOR TWISTING BALL DISPLAY", U.S. patent application Ser. No. 08/572,820 "ADDITIVE COLOR TRANSMISSIVE TWISTING BALL DISPLAY" now U.S. Pat. No. 5,892,497, U.S. patent application Ser. No. 08/572,780 "SUBTRACTIVE COLOR TWISTING BALL DISPLAY" now U.S. Pat. No. 5,767,826, U.S. Pat. No. 5,737,115 titled "ADDITIVE COLOR TRISTATE LIGHT VALVE TWISTING BALL DISPLAY", U.S. Pat. No. 6,128,124 "ADDITIVE COLOR ELECTRIC PAPER WITHOUT REGISTRATION OR ALIGNMENT OF INDIVIDUAL ELEMENTS", EP0902410 titled "METHODS FOR MAKING SPINNABLE BALL DISPLAY MEDIUM, AND DEVICE" and EP0935230 titled "COLORED BALL DISPLAY SYSTEM" which are incorporated by reference herein.

As shown in FIGS. 1 and 2, each of the spheres 30 is located within a cavity 38 of the transparent support material 34. Cavities 38 have a diameter slightly larger than the diameter of spheres 30 so that spheres 30 have the necessary rotational freedom without translational freedom. An optically transparent dielectric liquid 36 substantially fills the voids between spheres 30 and cavities 38.

Other gyricon displays have been proposed in which the surrounding media is a dielectric fluid 36 with no elastomer support material 34. U.S. Pat. No. 5,754,332 (Crowley, MONOLAYER GYRICON DISPLAY) and U.S. Pat. No. 5,825,529 (Crowley, GYRICON DISPLAY WITH NO ELASTOMER SUBSTRATE), both incorporated by reference herein, disclose gyricon or twistingball displays in which optically anisotropic particles, such as bichromal balls, are disposed directly in a working fluid, such as a dielectric liquid, without an elastomer substrate or other cavity-containing matrix. The display apparatus has an optically transmissive viewing surface, behind which the working fluid is disposed with the particles in it. In general, the absence of the support material 34 lessens the bistability of the display. The present invention is believed to work only with displays wherein the particles 30 have sufficient frictional surface contact with stationary elements to provide significant bistability.

Figure 2A:
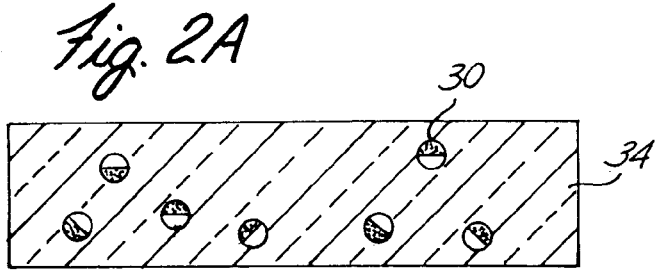
FIGS. 2A, 2B, 2C show a method of making the display of FIG. 1.
Figure 2B:
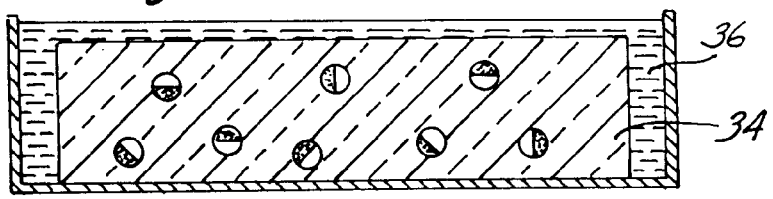
Figure 2C:
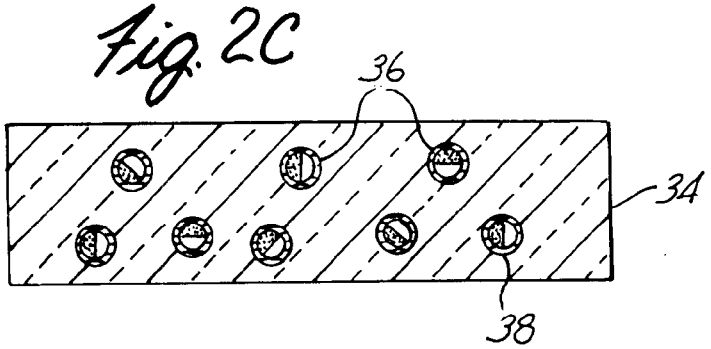

As shown in FIGS. 2A–2C, the panel 12 is preferably formed by thoroughly mixing the optically, electrically anisotropic particles 30 with an uncured (flowable), optically transparent material 34. One example of an uncured elastomer is freshly mixed Dow Corning SYLGARD 182 parts A & B. The optically transparent material is then cured, such as in the case of SYLGARD 182 by rapid heating to an elevated temperature of about 140° C. and maintaining the elastomer at that temperature for about 60 minutes and then cooling to room temperature. The cured elastomer provides the solid support material 34 shown in FIG. 2A in which the spheres 30 are in contact with support material 34 and thereby refrained from either rotational or translational movement.

Following curing and cooling of the support material 34, the support material 34 is placed in a dielectric liquid plasticizer 36, as shown in FIG. 2B, for a period of time, typically overnight, with the plasticizer 36 at room temperature. Preferably, the plasticizer 36 is ISOPAR-L. Alternatively, the dielectric liquid plasticizer 36 could be silicone oil, such as Dow Corning 10 Centistoke 200 oil when the elastomer is SYLGARD 182 or 184. Another satisfactory elastomer/plasticizer combination is Stauffer and Waker V-53 elastomer with the above silicone oil.

When the cured support material 34 is placed in the plasticizer 36, the plasticizer 36 is absorbed by the support material 34 resulting in a swelling of the support material 34. The spheres 30 are made of a material which does not absorb the plasticizer 36 at operating temperatures, with the result that the swelling of the support material 34 creates voids (spherical cavities 38) around the spheres 30, as shown in FIG. 2C. The voids or cavities 38 are filled with the plasticizer 36 and this structure allows easy rotation of the spheres 30, while permitting essentially no translation of spheres 30 relative to one another.

The support material 34 need not be an elastomer and in lieu thereof can be a rigid plastic such as polyethylene, polystyrene or plexiglass. Encapsulation can be achieved with the encapsulant molten or dissolved in a volatile solvent. An uncured rigid material such as an epoxy can be used as the encapsulant provided that it is light transparent.

It is necessary that the material of support material 34 absorb the plasticizer 36 more readily than do the spheres 30 in order that the cavities 38 may be formed. When the support material 34 is an elastomer, the spheres 30 can be plastics such as polyethylene, polypropylene or polystyrene which do not absorb the plasticizer 36. When the support material 34 is plastic, the spheres 30 must be of a material, which does not absorb the plasticizer 36, such as glass, or absorbs the plasticizer 36 substantially less than the plastic.

Figure 3:
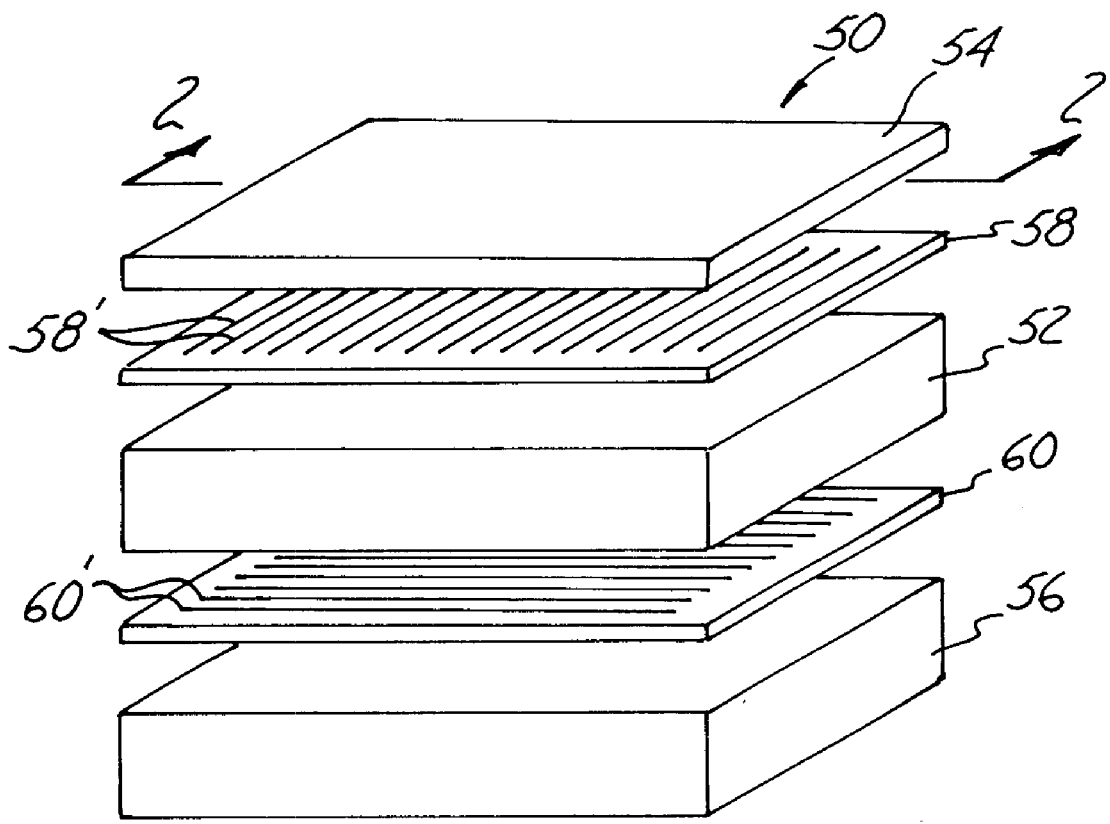
FIG. 3 is a perspective view of an alternative display utilizing electrode plates for indexing.
Figure 4:
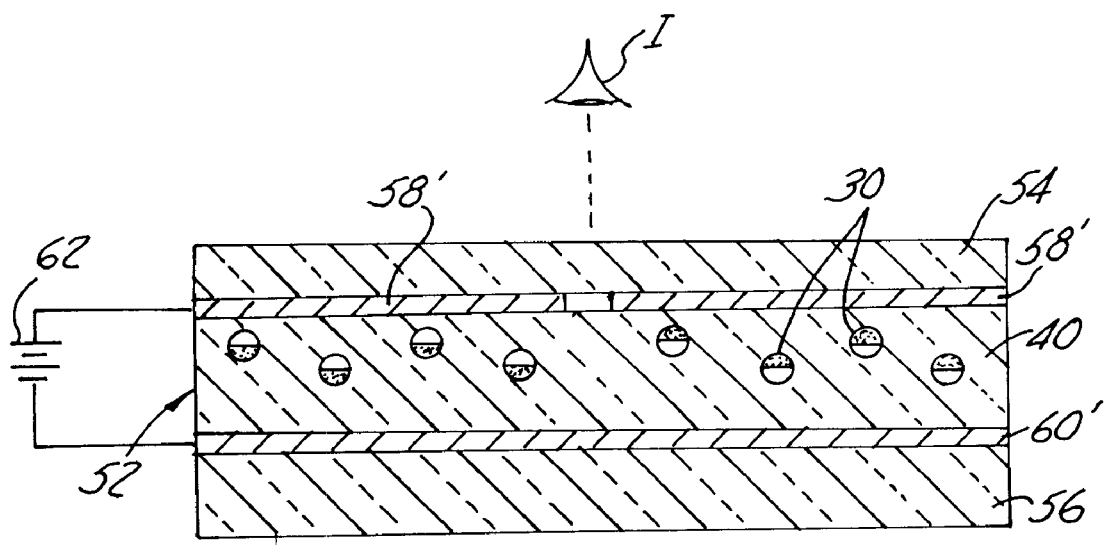
FIG. 4 is a sectional view of the display of FIG. 3 taken along line 2—2.

The inventive method can be applied to numerous other varieties of gyricon displays, such as the gyricon display shown in FIGS. 3 and 4 and described further in U.S. Pat. No. 4,126,854 (Sheridon, "TWISTING BALL PANEL DISPLAY") and U.S. Pat. No. 5,389,945 (Sheridon, "WRITING SYSTEM INCLUDING PAPER-LIKE DIGITALLY ADDRESSED MEDIA AND ADDRESSING DEVICE THEREFOR"), which are incorporated by reference herein. Unlike the multiple fixed image display of FIGS. 1 and 6, FIGS. 3 and 4 shows a gyricon display 50 which is randomly addressable, i.e., capable of indexing selected points at any given time to form any desired image, and which can further be controlled to show movement of the image. The display 50 includes a display panel 52 sandwiched between a top substrate 54 and a bottom substrate 56. The top electrode 58 includes a grid of parallel electrical conductors 58' and extends between the top substrate 54 and the display panel 52. At least the top substrate 54 and at least the conductors 58' of the top electrode 58 are optically transparent so that ambient light can impinge upon and reflect off the display panel 52. A bottom electrode 60, having parallel electrical conductors 60', extends between the bottom substrate 56 and the display panel 52. The conductors 60' of the bottom electrode 60 extend at an angle, preferably orthogonal, to the conductors 58' of the bottom electrode substrate 58.

As shown in FIG. 4, display panel 52 provides a visible, addressable image to be viewed at I. A power source 62 is coupled across the top electrode 58 and the bottom electrode 60, as shown in FIG. 4, and is controllable such that each conductor 58', 60' can be individually energized or de-energized. The spheres 30 within the field developed by the energized grids 58' and 60' will rotate in a reversible electric field, but without substantial translation, such that the light reflecting hemispheres 30b are oriented toward I. By sequentially coupling the source 62 to chosen crossover points of electrodes 58' and 60', the electric and/or magnetic field at each crossover point is selectively controlled. The bead(s) 30 positioned at each crossover point can be rotated by energizing the crossover point to concentrate the electric and/or magnetic field at that crossover point. In this way, each pixel of the image is selectively addressable to present a light or dark shading through positive or negative energization of the crossover point. By reversing the polarity of source 62 at any given crossover point, the bead(s) at that crossover point are rotated to change color.

Figure 5:
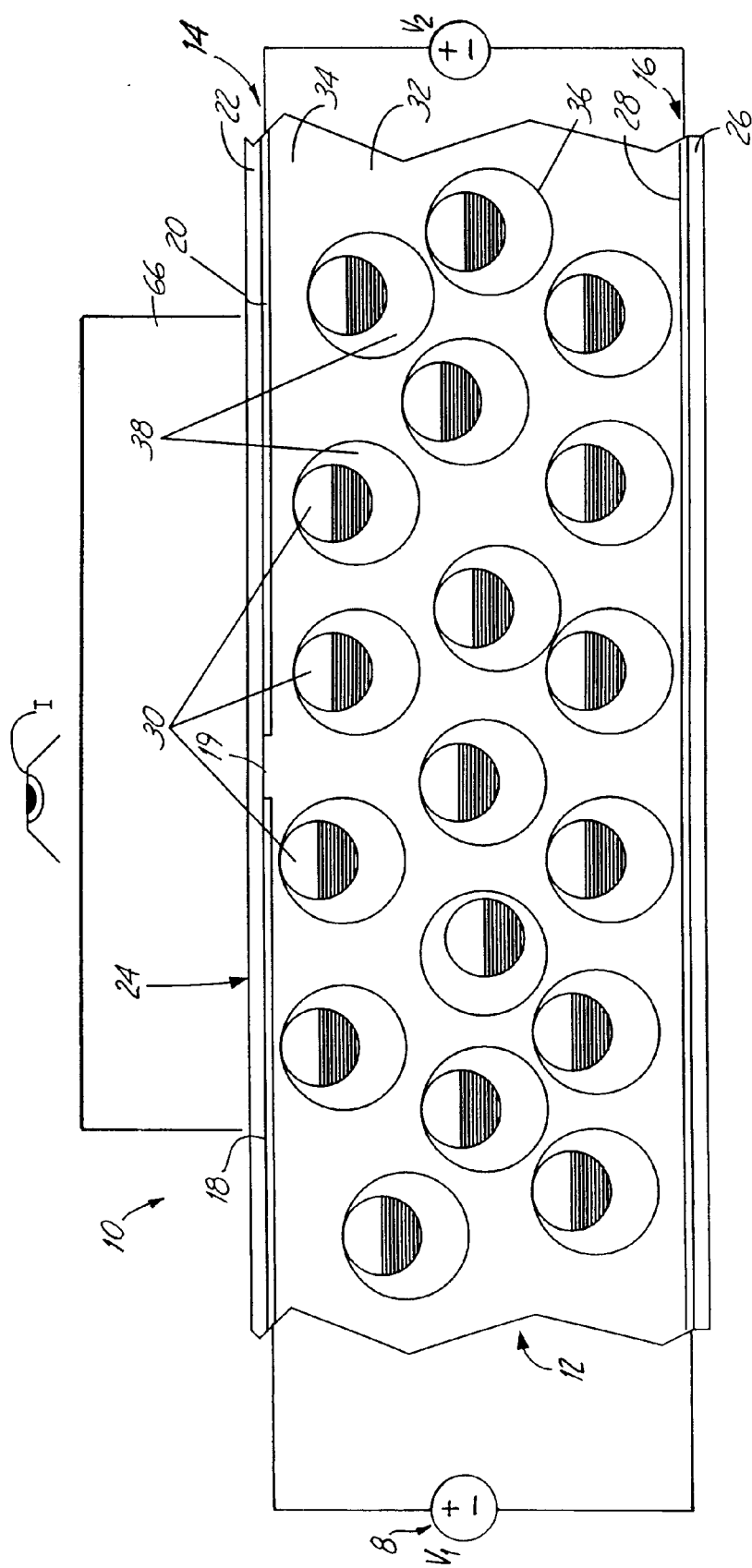
FIG. 5 is a schematic illustration of the inventive method as applied to the gyricon display of FIG. 1.

The inventive heating process shown in FIG. 5 includes heating the display 10. For the display panel 12 having elastomer 34 and dielectric fluid 36, the heating process is performed after the elastomer 34 has been fully cured, cooled and swelled with dielectric fluid 36. A heat reservoir such as an aluminum bar 66 is placed on the surface 24 of the display 10 to provide heat to the display 10 by conduction heating. Conduction heating is preferred because the heating occurs very rapidly. Conduction heating in this manner allows the heating process to be carefully controlled, as the heat source can be immediately removed by separating the bar 66 from the display 10. One way to control heating of the bar 66 is to connect a digital temperature controller to a resistance heating cartridge centered in the bar 66.

For the preferred elastomer and dielectric fluid, the bar 66 is heated to a temperature of 35° C. or greater and maintained in contact with the display for a limited duration such as two hours or less. More preferably, the bar 66 is maintained between 40° C. and 60° C., and contact between the bar 66 and the display 10 is maintained for less than 10 minutes, such as approximately one to two minutes. Most preferably, the bar 66 is held at a temperature of 50° C., and contact is maintained for about two minutes.

In another embodiment of the inventive method, the bottom sheet electrode 16 can be heated separately or simultaneously with the top electrode sheet 14, that is, heat maybe applied from either side of the display panel 12. The display 10 can alternatively be heated by numerous heat transfer mechanisms including convection and radiation. Other alternative heating embodiments include mechanical heating, chemical heating, and electrical resistance heating. Other embodiments include varying the temperature of the heat reservoir.

During the application of heat, the particles 30 are preferably agitated within the display. For instance, a power source 64 —which may or may not be the same power source V1, V2 for the display 10 in operation —may provide a controllable electric or magnetic field. The voltage of the exercising electric field should be about one to three times the switching voltage of the rotating particles 30. In the preferred embodiment, the switching voltage is about 50 V, and thus an exercising voltage of about 100 V is applied to the top and bottom electrode sheets 14, 16. Since the distance between the top and bottom electrode 14, 16 is about 15–18 mils (380–460 microns), this corresponds to an electric field equivalent to 0.2–0.3 V/micron. To agitate the particles 30, the electric field must be reversed to cause rotation of the particles. For instance, the electric field may be reversed at a one second cycle rate throughout the one to two minutes of heating. Alternatively, the exercising step can be performed before or after the application of heat.

Other embodiments include selecting different amounts of time the heat reservoir 66 is placed on the display 10. The maximum or minimum temperature of the display 10 is a function of the amount of time the heat is applied. If the heat reservoir 66 is heated to a temperature above 50° C., then the duration of contact between the heat reservoir 66 and the display 10 can be decreased. That is, heating at a higher temperature for a shorter time may equivalently improve the rotatability. As the temperature is increased, the heating duration should be lowered to prevent degradation of the rotating beads. Alternatively, if the heat reservoir 66 is maintained at a temperature lower than 50° C. (less than 25° C. above room temperature), the heating duration can be increased.

The cycling rate of the exercising force is preferably selected as a function of the heating temperature and heating time duration. In the preferred embodiment, a one second cycle rate (1 Hz) is applied to the display while the display is heated to 50° C. for about one to two minutes, i.e., 60 to 120 cycles. Similar benefits may be achievable in a shorter heating duration if the cycle rate is increased.

The voltage differential applied to the display is preferably selected as a function of the temperature of the heating, the heating duration, and the cycle rate. The voltage of the electric field is typically one to three times the switching voltage of the rotating particles. Thus, if the voltage were increased beyond one to three times the switching voltage, the heating temperature, the heating duration, and the cycle rate could all be uniformly or independently decreased.

The inventive heat/exercise treatment improves the dynamic performance of a gyricon display 10. In most cases, the heating and exercising steps are attributable to the improvement of the gyricon display. In some cases, the heating alone may be the only cause for the improvement. In other cases, the exercising alone may be the reason for the improvement. The present invention improves the display's visual appearance during use by causing more structures 30 to rotate by virtue of the applied switching field. The performance improvement from the heat treatment on the display 10 is sustained after the heated region has cooled. With no signs of reversion for over a year, the improvement appears to be permanent.

Specific benefits which result for display applications include: (1) higher contrast between black and white regions, (2) white regions become lighter (by several shades), (3) black regions become darker (by several shades), (4) the switching time between black and white is faster, and (5) a decreased number of non-switching structures (i.e., beads). Prior art gyricon displays may have approximately 85% or less of the particles which rotate under application of a switching electric field. Unexpectedly, the present invention increases the percentage of rotating particles 30 to approximately 90% or more of the particles.

Several related phenomena are believed to account for the surprising beneficial results of the present invention. The reason for poor performance of prior art gyricon displays may be because a significant percentage (15% or more) of the beads 30 fixedly "stick" to the cured elastomer matrix 34 during curing of the elastomer. Even after the elastomer is fully saturated with dielectric fluid 36, a significant percentage of beads 30 remain stuck. For some beads 30, the initial stiction is too great to ever be overcome by the torque force provided by the switching field. Particles 30 which are stuck to the cavity wall 38 either do not rotate at all or do not fully rotate. Prior art methods of manufacture have not considered the sticking bead problem, and have not proposed methods to reduce or eliminate the number of beads which are stuck.

The present invention is intended to improve the rollability of the beads 30 in their respective cavities. The objective is to have 100% of the beads 30 roll under the switching field, but to maintain bistability such that none of the beads 30 rotate under mechanical jostling or application of a field lower than the switching field. In particular, the present invention is believed to initially break a greater percentage of particles 30 loose from their cavity walls 38. Once broken loose a first time, the static friction holding the particle 30 in place is smaller, and the particle 30 can be more easily rotated a second time. The dielectric fluid then acts as a lubricant, fully wetting all surfaces of the particle, and minimizing re-sticking of the particles 30 to the cavity walls 38. More of the particles 30 roll more consistently under the application of the switching field. At the same time, the present invention does not reduce static friction between the particles 30 and the cavity walls 38 to far, and bistability of the particles 30 in the absence of the switching field is maintained.

Applying heat to the display 12 enlarges the cavity 38 surrounding each particle 30 due to thermal expansion of the surrounding media 34. In part, the particles 30 may be easier to jar loose by exercising the particle 30 while the cavity is larger. However, heating the particles 30 will also cause thermal expansion of the particles 30. If there is a coefficient of thermal expansion mismatch between the elastomer 34 and the particles 30, one material will expand at a different rate than the other. When the elastomer 34 and the particles 30 are heated over a same change in temperature, the elastomer 34 and the particles 30 expand at different rates depending on their respective coefficients of thermal expansion. For a particle 30 which is stuck to the elastomer over a significant length of the particles' circumference, the different amounts of thermal expansion will cause a compressive/tensile force at the contact interface between the particle and the cavity wall. For many stuck particles, heating causes a thermal expansion induced stress at contact interface between the elastomer 34 and particle 30 which is sufficient to overcome the stiction and "pop" the particle loose within its cavity 38. Depending upon how much of the mismatch there is between the coefficients of thermal expansion of the particle 30 and the elastomer 34, heating alone may be sufficient to initially pop the particle loose. For other particles, and particularly when the particles have a coefficient of thermal expansion which is close to the coefficient of thermal expansion of the elastomer, an exercising torque force is needed with the thermal expansion to pop the particle loose. The particles 30 are exercised within their respective cavities 38 with the selective application of an electrical field to the display. The electric field provides a mechanical torque force to jostle the particles 30 sliding along the cavity walls 38, and thereby frees particles still bound to the elastomer 34.

Another mechanism involved in the improvement of the rotatability of the particles may be the transient effects of a relatively quick heating/cooling operation, i.e., thermal shock. Heating and cooling the display has transient effects when transient heat transfer properties, such as coefficient of thermal conduction and specific heat, differ between the elastomer material and the particle material. Heat from the heating source first travels through the elastomer before reaching the particles contained within the cavities of the elastomer. The time difference between the elastomer heating up and the particles heating up affects how each component's material properties reacts to the heating. After the heat is removed, the elastomer cools more rapidly than the more centrally located particles. The time difference for each component to cool also affects how each component's material properties responds to the cooling of the display. Thus, workers skilled in the art will appreciate that the heating/cooling operation (how fast and where heat is applied, at what temperature for how long) can be tailored to create the largest heat induced stress at particle/cavity interface to facilitate popping more particles loose. In general, the preferred embodiment is to heat as quickly as possible through conduction heating to the desired temperature and then remove the heat source and allow slow convection cooling. Depending upon the materials used, a slow heating followed by a quick quenching cooling may provide more beneficial results.

Other mechanisms are possibly involved toward the improvement of the rotatability of the particles 30. The rapid switching of the beads 30 during exercising may micropolish the surface of the beads. The amount of micropolishing is likely to be due in part to the solubility of the bead material in the plasticizer/dielectric fluid as a function of temperature. By simultaneous heating and exercising, the surface of each bead and its corresponding cavity may be smoothed on a microscopic level, polishing one another. The smooth interface between each bead and its cavity remains after cooling, so the display retains beneficial results and each bead more fully rotates during use of the display. The total number of cycles and the switching time for those cycles may be selected to achieve the desired level of micropolishing for the particular combination of materials used for the beads 30, elastomer 34 and plasticizer/dielectric fluid 36. For example, it may be beneficial to have a faster switching time during heating the display than during cooling, or vice versa.

The unsticking of the beads in the cavities 38, together with any micropolishing effect, enables a larger percentage of the particles 30 to rotate significantly faster and to a greater degree. Since a particle's rotation is no longer constrained, the particle 30 is freer to rotate to a greater degree thereby improving the resolution, the reflectance and the overall quality of the display 12. Heating the display 10 in accordance with the present invention thus decreases the switching time between black and white, and decreases the number of non-switching particles.

Other methods may be used to unstick the particles and achieve any micropolishing affect. For instance, sonic or ultrasonic treatment of the swollen gyricon film 12 may also improve the rotatability of the rotating structures 30, and thereby accomplish the invention. To perform an ultrasonic treatment on the display media 36, the rotating structures 30 are first embedded into the elastomer 34. The structures 30 are swelled in the elastomer 34 and then ultrasonic energy is applied to the elastomer 34, similar to conductive heating with magnetic exercising. Sonic or ultrasonic energy simultaneously excites the embedded structures 30 while increasing the temperature of the elastomer 34, thereby improving the rotatability of the structures 30.

As used herein, "exercising" or "agitation" of the rotating structures 30 includes any means producing a mechanical force to loosen the beads from the cavity walls. For example, feeding the display panel 12 between the nip of two rollers may provide a sufficient mechanical force to initially break a higher percentage of beads loose.

By selectively controlling the heating and the amount of time the heating is applied at different regions of the display 10, the inventive method can be used to control the gray scale effect of the display 10 viewable from I. For example, one region of the display is heated at 50° C. for about 2 minutes while simultaneously exercising the particles 30. Another region of the display 12 is then heated at 50° C. for about 30 seconds while simultaneously exercising the particles 30. Varying the heating times in different regions of the display would affect the gray scale of the display. The region under heat longer would be darker (or lighter, depending on the polarity of the electric field) than the region with less of a heat treatment.

By rotating the beads within the fluid-filled cavity, substantially all portions of the beads receive lubrication from the dielectric fluid. Once lubrication is complete, the electrical force causes the beads to rotate and point either its black or white hemisphere towards the transparent surface.

In addition to heating and exercising the structures 30 in the display media 32, the rotatability of the structures 30 can also be improved by drawing different pressures on the fluid 36 between the top and bottom electrode sheets 14 and 16. Pressure treatment can improve the rotatability of the particles 30 in several ways. First, drawing a vacuum on the display panel 12 can result in microscopically enlarging gasses in the elastomer 34 and/or dielectric fluid 36, creating a size differential between the beads 30 and the cavities 38 similar to heating/differing coefficients of thermal expansion discussed above. Second, degassing of the elastomer 34 and/or dielectric fluid 36 results in vapor bubbles being released therefrom and subsequently causes contraction thereof, again creating a size mismatch stress between the beads 30 and the cavity walls 38. Finally, pressure shocking of the display 12 may cause mechanical stress at the interface between the beads 30 and the cavity walls 38, causing more of the beads 30 to pop loose from the cavity walls 38.

EXAMPLES

Example 1

FIGS. 7–10

Figure 6:
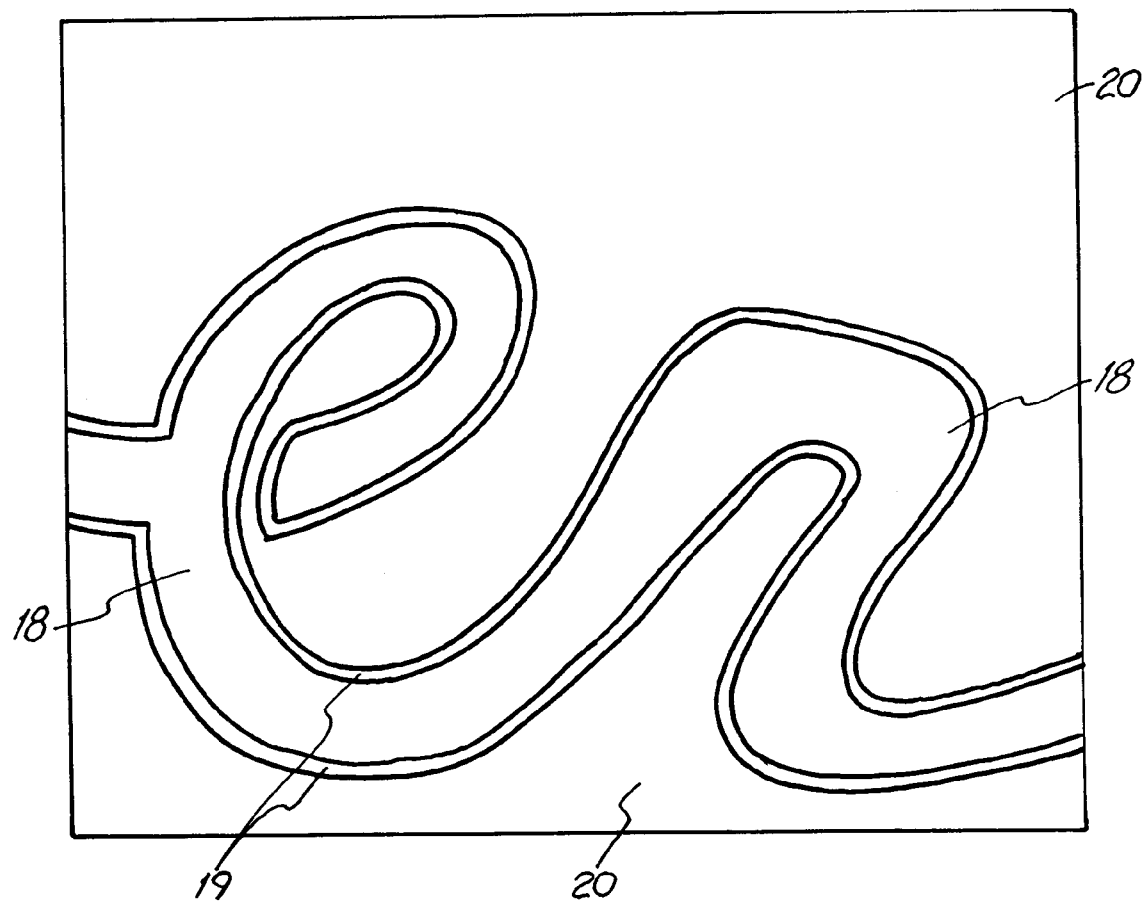
FIG. 6 is a plan view illustrating the display of FIG. 1 in which the electrode plates form the script letter "er".

The gyricon display 10 used in this example was a glass enclosed display. A 15 mil gyricon film (with a swollen thickness of 18 to 20 mil) and including 90–105 micron gyricon beads 30 was placed between two sheets of glass 22, 26. The display 10 was formed as a multiple fixed image display. FIG. 6 is a top view of the gyricon display 10 of FIG. 1 showing the first and second ITO electrodes 18, 20 divided by a insulative region 19 to form the script "er". The insulative region 19 provided about 50 microns of separation between the first and second electrodes 18, 20. The script "er" was around 5–7 mm in height. The backside electrode 28 had a conductive ITO coating applied thereto. To form the script "er", the first electrode 18 was oppositely charged from the second electrode 20. Thus, the first and second electrodes 18, 20 operated independently of the backside electrode 28 to form an image viewable at I.

Figure 7:
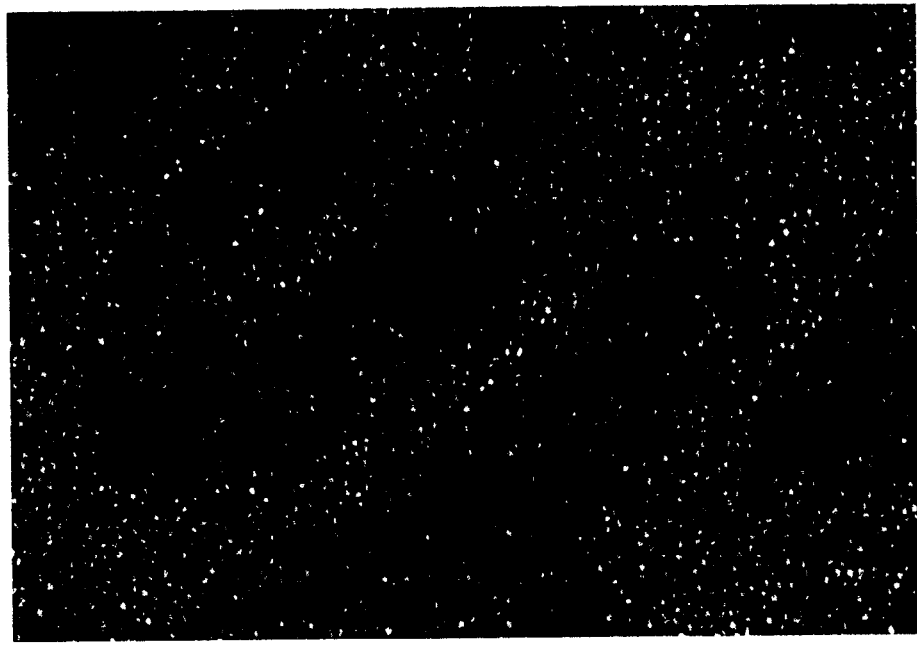
FIG. 7 is a photo of spheres in a black/white gyricon display, before application of the inventive method thereto (showing a close-up of the script letters "er" ).
Figure 8:
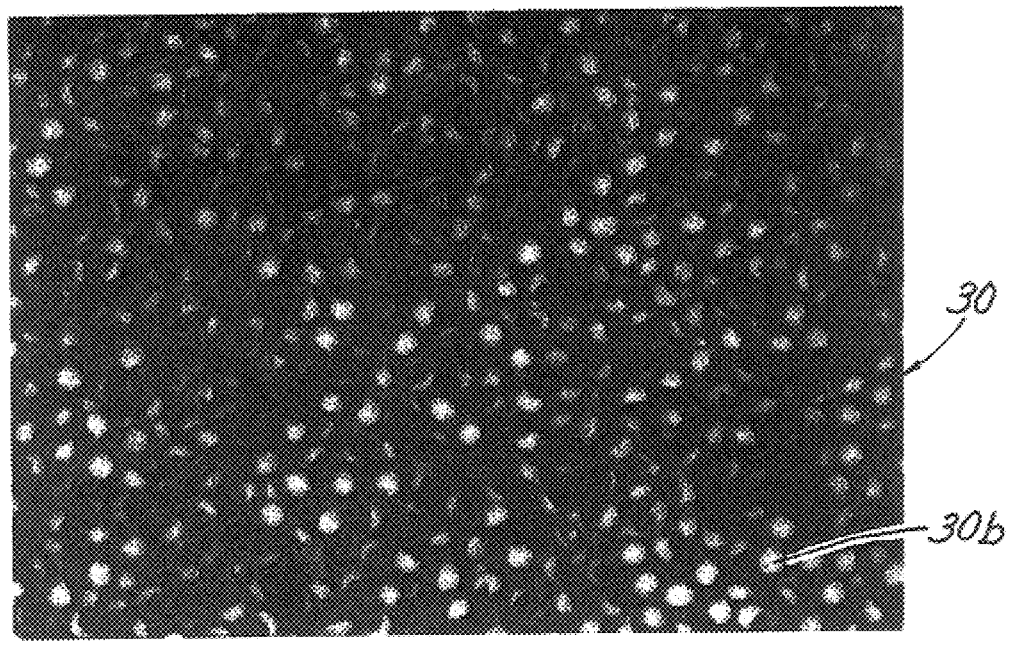
FIG. 8 is an enlarged photo of the balls in the white portion of a black/white gyricon display, before application of the inventive method thereto.

The typical image definition attained by this gyricon display 12 before being subjected to the inventive treatment is illustrated in FIG. 7. FIG. 7 is a photo of the spherical structures 30 in a portion of a gyricon display 12 (a closeup of script letters "er") before the heat treatment. FIG. 8 is an enlarged photo of the balls 30 in the white portion of a black/white gyricon display 12, before application of the inventive method thereto.

The viewing surface 24 of the top electrode sheet 14 was heated. An alternating positive/negative electrical field was then applied to the display 10 to exercise the indicia structures 30 within the display panel 12.

This gyricon film display 12 was heated from an ambient temperature to 50° C. by use of the heated bar 66. In Example 1, the heat reservoir 66, was an aluminum bar with dimensions 1 inch×4 inch×½ inch. The heat reservoir 66 was preheated to 50 degrees Celsius and held at that temperature. The heat reservoir 66 was placed on the viewing surface 24 of the display 10 for one to two minutes while exercising the bichromal balls 30 in the display between the black and white states at a one second cycle rate, i.e., at 1 Hz. The exercising of the structures 30 was by the application of an oscillating electric potential of 100 volts across the first and second electrodes 18, 20 and the backside electrode 28 of the display 12.

Figure 9:
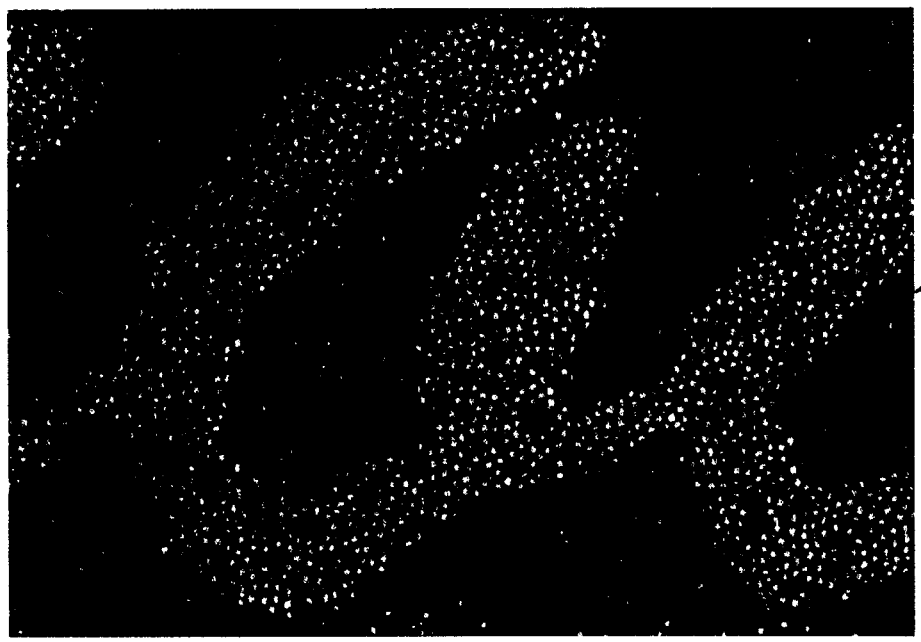
FIG. 9 is a photo of spheres in a black/white gyricon display, after application of the inventive method thereto (showing a close-up of the script letters "og" ).
Figure 10:
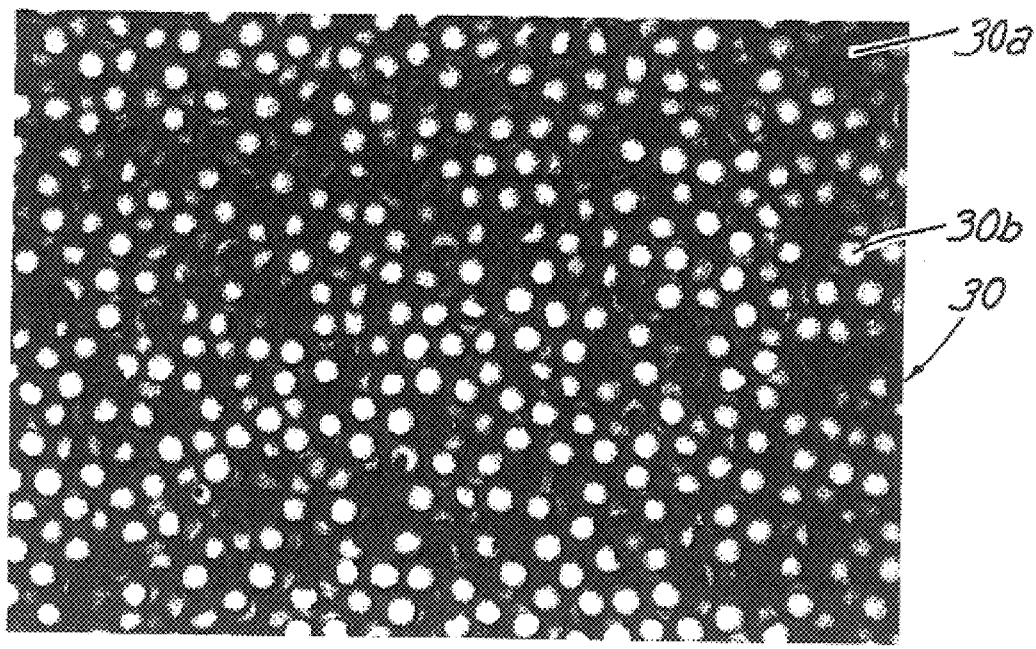
FIG. 10 is an enlarged photo of the balls in the white portion of a black/white gyricon display, after application of the inventive method thereto.

FIG. 9 is a photo of a portion of the gyricon display 12 (a closeup of script "og") after treatment by the inventive method. FIG. 10 is an enlarged photo of the balls in the white portion of a black/white gyricon display 12, after application of the inventive method thereto. As is quite apparent, there is a striking and surprisingly significant improvement in the contrast and resolution of the desired image (in this case, text). The improvement is illustrated by the improved display of white hemispheres 30b of balls 30 after treatment by the inventive methods. The use of the inventive method results in a much greater number of the balls 30 aligning with their desired hemisphere to the viewer (in this case, the white hemisphere), thereby achieving a much greater contrast, purity of color and visibility for the image being presented. Although not shown in enlarged detail like FIGS. 8 and 10, the black portions 30a of the desired image are likewise "blacker" because the inventive treatment causes a greater number of balls to present their black hemispheres to a viewer than occurred without treatment.

Example 2

Figure 11:
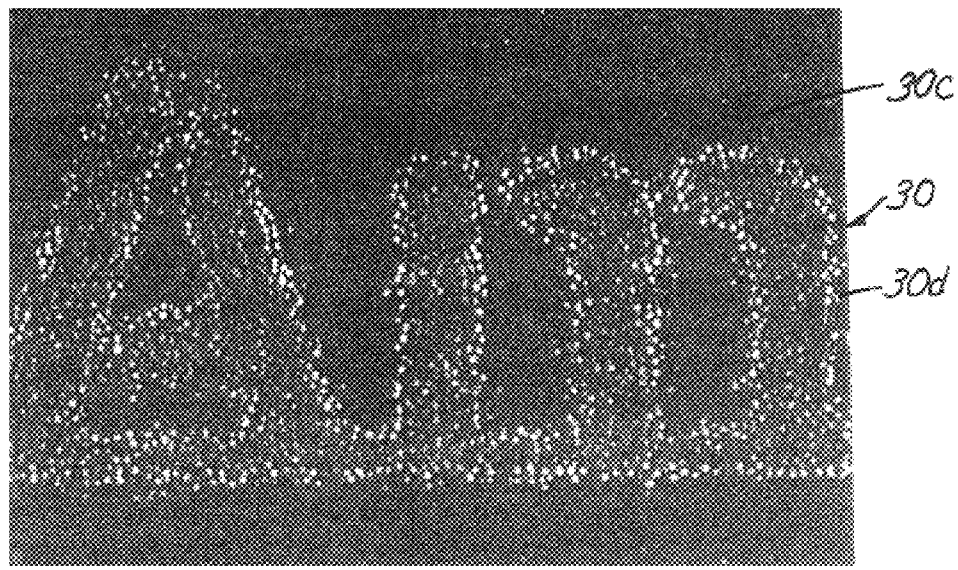
FIG. 11 is a photo of spheres in the red/white gyricon display of Example 2 below, before the application of the inventive method thereto (showing a close-up of the letters "Am" ).
Figure 12:
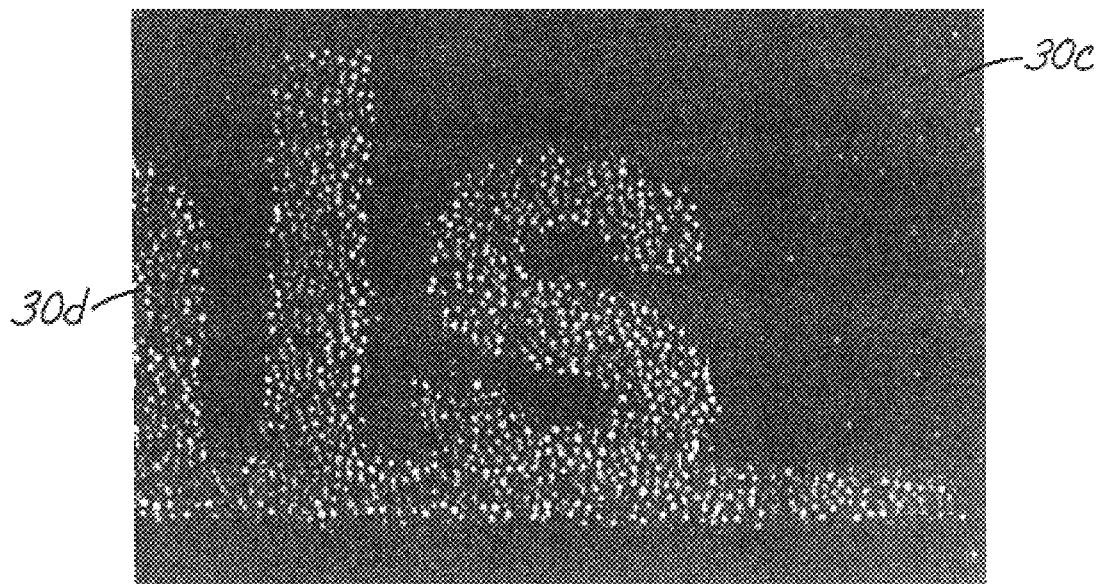
FIG. 12 is a photo of spheres in the red/white gyricon display of Example 2 below, after the application of the inventive method thereto (showing a close-up of the letters "Is" ).

FIGS. 11 and 12

In Example 2, the rotatable structures (balls) 30 of the gyricon display 10 had a red hemisphere 30c and a white hemisphere 30d as seen in FIGS. 11 and 12. The inventive method of applying heat to a gyricon display film and exercising the structures within the display film was performed on the gyricon display film containing the structures with the red 30c and white 30d hemispheres, in the same general manner as described above. FIGS. 11 and 12 compare the "before" (FIG. 11) and "after" (FIG. 12) resolution and contrast of this example, again illustrating the significant and surprising improvements achieved by use of the present invention. Specifically, the interior coloring of the lettering was improved by the inventive method.

Although the present invention has been described with reference to preferred embodiments, workers skilled in the art will recognize that changes may be made in form and detail without departing from the spirit and scope of the invention. For example, the improved rotatability of the structures attained by the inventive method will enhance future implementations of gyricon films, such as light control films, multicolor displays and the like.

What is claimed is:

1. A method for improving the rotatability of optically anisotropic particles disposed in a surrounding media of a gyricon display, the surrounding media disposed behind an optically transmissive viewing surface, the method comprising:

heating the display for a limited time; and agitating the optically anisotropic particles relative to the surrounding media during heating.

2. The method according to claim 1, wherein the display is heated to more than 35 degrees Celsius.

3. The method according to claim 1, wherein the heating step is performed for less than 2 hours.

4. The method according to claim 1, wherein the heating step is performed for less than 10 minutes.

5. The display of claim 1, wherein the surrounding media of the display has been heat cured, cooled and swelled by a plasticizer before the display heating step.

6. The display of claim 5, wherein the plasticizer is an optically transmissive dielectric fluid.

7. The method according to claim 1, wherein the optically anisotropic particles are generally spherical.

8. The method according to claim 1, wherein the surrounding media is heated to approximately 50 degrees Celsius.

9. The method according to claim 8, wherein the display is heated for about one to two minutes.

10. The method according to claim 1, wherein the optically anisotropic particles are electrically anisotropic and wherein the agitating step includes alternating an electric field to the display and thereby rotating the optically anisotropic particles relative to the surrounding media.

11. The method according to claim 10, wherein the alternating electric field is driven at one to three times the switching field for the display.

12. The method according to claim 10, wherein the agitating step includes alternating a magnetic field at about 1 Hz rate for about one to two minutes.

13. The method according to claim 1 wherein the heating act comprises contacting the gyricon display with a conductive heat source.

14. The method according to claim 1 wherein both heating and agitation are accomplished by application of sonic or ultrasonic vibration.

15. A method for improving visual contrast in gyricon media having a plurality of rotating optically anisotropic particles, the method comprising:

surrounding rotating optically anisotropic particles with a surrounding media;

fully curing the surrounding media;

swelling the fully cured surrounding media with a dielectric fluid; and heating the swelled fully cured surrounding media.

16. The method according to claim 15, wherein the optically anisotropic particles are electrically anisotropic, and further comprising:

agitating the optically anisotropic particles relative to the surrounding media by applying an electrical field to the rotating optically anisotropic particles and thereby rotating the optically anisotropic particles relative to the surrounding media.

17. A method for improving visual contrast in gyricon media having a plurality of rotating optically anisotropic particles, wherein the optically anisotropic particles are electrically anisotropic, the method comprising:
- surrounding rotating optically anisotropic particles with a surrounding media;
- curing the surrounding media;
- swelling the surrounding media with a dielectric fluid;
- heating the swelled surrounding media; and
- agitating the optically anisotropic particles relative to the surrounding media by applying an electrical field to the rotating optically anisotropic.

18. A method for improving visual contrast in gyricon media having a plurality of rotating optically anisotropic particles, the method comprising:
- surrounding rotating optically anisotropic particles with a surrounding media;
- curing the surrounding media;
- swelling the surrounding media with a dielectric fluid; and
- heating the swelled surrounding media;
- wherein the rotating optically anisotropic particles are dispersed in a surrounding media between two retaining members, and further comprising:
- drawing a vacuum between the retaining members so as to degas the surrounding media.

19. The method according to claim 18 further comprising:
- agitating the optically anisotropic particles relative to the surrounding media.

20. A gyricon display with improved particle rotatability, comprising:
- a surrounding media retained between upper and lower sheets, the surrounding media comprising a cured elastomer swelled with dielectric fluid; and
- optically anisotropic particles dispersed in the surrounding media, the optically anisotropic particles being beads which have been polished in situ through heating the gyricon display and agitation of the beads.

21. The gyricon display of claim 20, wherein over 90% of the beads rotate with application of an electric field after heating.

* * * * *